April 29, 1952 J. D. LANGDON 2,594,318
VALVED COUPLING
Filed March 19, 1947

Jesse D. Langdon Inventor

Patented Apr. 29, 1952

2,594,318

UNITED STATES PATENT OFFICE 2,594,318

VALVED COUPLING

Jesse D. Langdon, Long Beach, Calif.

Application March 19, 1947, Serial No. 735,732

4 Claims. (Cl. 137—69)

The present invention relates to hose couplings, and aims to prevent a greater condition of pressure existing externally of the coupling from entering said coupling when a lesser condition of pressure exists within the coupling, when the coupling is attached to a source of pressure fluid supply.

A primary purpose of the invention is to provide a double safeguard against the backflow of fluid thru a hose and coupling means attaching the hose to a source of pressure fluid supply by the use of double check valve means normally held in closed position.

Other and further objects and purposes of the invention will appear as the specification proceeds, as illustrated by the drawings which illustrate means of reduction to practice which is used for the purpose of illustration only and may be changed within the scope of the appended claims.

Figure 1:
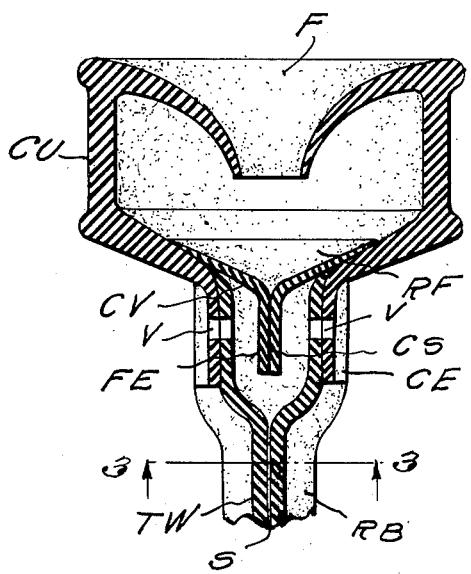
Fig. 1 is a vertical section of the invention, as at 1—1 of Fig. 2.
Figure 2:
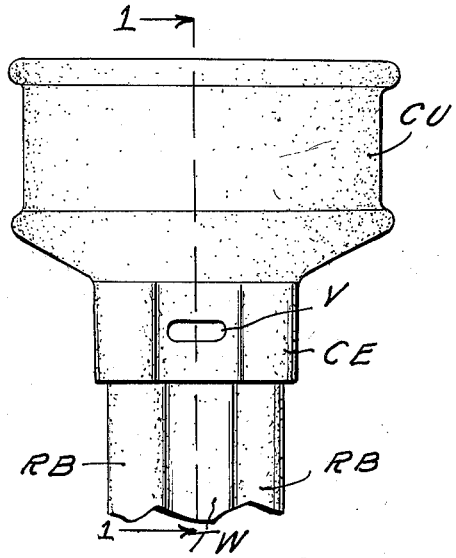
Fig. 2 is a broadside elevation.
Figure 3:
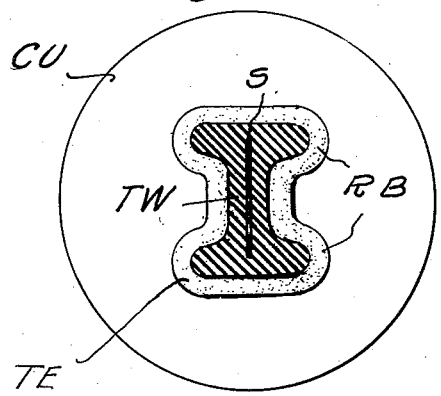
Fig. 3 is a transverse sectional view of the invention looking upward as at 3—3, Fig. 1.
Figure 4:
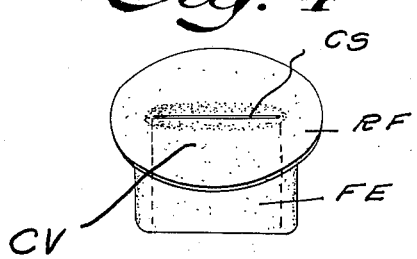
Fig. 4 is a plan elevation of an auxiliary check valve made of flexible material.
Figure 5:
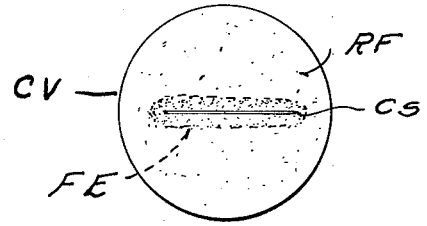
Fig. 5 is a plan of the auxiliary check valve looking downward.

The structure of the valved coupling unit comprises a unit or casing CU made of deformable material capable of returning to normal shape, and having a funnel shaped adapter portion F projecting forwardly into, and surrounded by a cylindrical wall portion of the unit CU spaced away from the small end of the funnel F. The lower end of the unit CU is formed with a bottom converging inwardly and tapered downwardly of the cylindrical wall of the casing CU to form a tubular extension CE, configurated to conform with and surround the enlarged end forming an extension of tube TW thus providing conjoining surfaces between the configurated outlet extension CE and the outer wall surface of the tube TW. It will be noted that the entire unit is capable of being deformed from the effects of changing the relationship of pressure conditions internally and externally of the unit CU.

A check valve member CV is made of suitable flexible material and preferably has a flat elongated portion slit as at CS and a retaining flange RF. The slit portion of the check valve CV forms a flat tubular extension FE. The check valve CV is inserted into the hollow portion of the body CU and is held in position by the enagement of retaining flange RF with the sloping bottom of the body CU, so that the flat extension FE projects into a space formed in the end of the hose TW which is extended into and encompassed by the coupling extension CE. Vents V are perforated thru the coupling extension CE and the adjacent wall of the hose TW, said vents communicating with the space surrounding the flat extension FE and atmosphere.

The invention operates substantially as follows:

When the flexible adapter F is attached over an outlet from a source of fluid pressure supply with pressure fluid running thru the coupling CU, the check valve slit CS is forced open urging the walled portion thereof apart to close the vents V; the thin walled portion of the hose TW is also forced apart below extension CE by fluid pressure permitting fluid to flow therethru. When a lower condition of pressure exists internally of the coupling unit CU than that existing externally thereof, the external pressure will enter thru vents V and urge the walls of the check valve CV tightly together.

The coupling unit CU together with the check valve CV and the flat hose TW, all being made of soft flexible material capable of being deformed and returning to normal shape after being deformed, will be subject to collapse from external pressure greater than internal pressure. Therefore both the hose and the check valve CV may be urged together to resist the backflow of fluid pressure toward the source of pressure fluid supply to which the invention is attached.

Having described the invention and the operation thereof, the following claims are made:

1. A valved coupling unit comprising a casing having inlet and outlet ends and a connecting cylindrical hollow body portion, said casing being made of deformable material capable of returning to normal shape, and having the inlet end formed with a funnel shaped adapter portion, the small end of the funnel projecting forwardly into said cylindrical hollow body portion and the outlet end of said casing extending inwardly of the cylindrical wall of the hollow body, one portion of said outlet end being coniform and extended forwardly of the small end of the funnel, another portion of said outlet being configurated to form a jointing surface conforming with the enlarged end of a tube of flexible material attached thereto, a space formed within the conjoining portions of said another portion and said enlarged end of said tube, a check valve member having a flange flared and extended over the inner surface of the coniform portion of said outlet end and having a lipped portion projecting into the space within said conjoining portions of the tube and the extension, the projecting portion of said check valve extending across vent means communicating with atmosphere thru the wall surrounding said space within said conjoining portions, whereby fluid under pressure within and flowing thru said hollow body, said check valve and said tube will cause the wall of said projecting portion of said check valve to close said vent means, and whereby a sub-atmospheric pressure within said hollow body will permit said tube, said check valve and said hollow body to collapse under the influence of external atmospheric pressure and seal said valved coupling against the ingress of external fluid pressure.

2. A device as of claim 1 wherein the lipped portion of the check valve forms a slit passage therethru said tube having a slit passageway extending therethru, whereby external pressure will urge the walls of the slit check valve and slit tube to close the respective passages thru said check valve and said tube.

3. A device including a hollow body having inlet and outlet ends, the inlet end provided with coupling means for attaching same to a source of fluid pressure supply; having combined therewith a check valve member made of deformable material contiguous with and disposed within the outlet end of said hollow body and having a slit end bordered by a wall forming lip means projecting into a tubular extension concomitant with the wall of said hollow body, vent means perforated thru the walls of the extension and communicating with atmosphere, said slit end extended beyond said vent means and capable of being urged apart and opened by sufficient internal pressure, whereby the wall means bounding said slit end is urged toward the walls of said tubular extension to close said vent means.

4. A device as of claim 3 having a flat tube of deformable material attached to and extended from the tubular extension whereby the cessation of internal pressure within the hollow body will permit the check valve member to collapse and atmospheric pressure to enter the tubular extension permitting the flat tube to drain and the walls thereof to be urged together and assume normal shape.

JESSE D. LANGDON.

REFERENCES CITED

The following references are of record in the file of this patent:

UNITED STATES PATENTS

| Number | Name | Date |
| --- | --- | --- |
| 1,888,842 | Allan | Nov. 22, 1932 |
| 2,270,737 | Langdon | Jan. 20, 1942 |
| 2,314,357 | Lehman | Mar. 23, 1943 |
| 2,322,631 | Groeniger | June 22, 1943 |
| 2,347,988 | Burke | May 2, 1944 |
| 2,352,642 | Langdon | July 4, 1944 |